United States Patent

Ju et al.

Patent Number: 5,811,774
Date of Patent: Sep. 22, 1998

[54] EXTENDED WORKING RANGE DATAFORM READER WITH REDUCED POWER CONSUMPTION

[75] Inventors: Paul P. Ju; Ynjiun P. Wang, both of Ft. Myers, Fla.

[73] Assignee: Metanetics Corporation, Ft. Myers, Fla.

[21] Appl. No.: 698,428

[22] Filed: Aug. 15, 1996

Related U.S. Application Data

[60] Division of Ser. No. 507,607, Jul. 25, 1995, which is a continuation-in-part of Ser. No. 494,435, Jun. 19, 1995, Pat. No. 5,780,833, Ser. No. 332,592, Oct. 31, 1994, Pat. No. 5,521,366, and Ser. No. 280,489, Jul. 16, 1994, Pat. No. 5,572,006.

[51] Int. Cl.$^6$ ........................................ G06K 7/10
[52] U.S. Cl. ............................ 235/455; 235/472
[58] Field of Search ........................... 235/455, 472

[56] References Cited

U.S. PATENT DOCUMENTS

| | | |
|---|---|---|
| 4,210,802 | 7/1980 | Sakai . |
| 4,409,470 | 10/1983 | Shepard et al. . |
| 4,734,566 | 3/1988 | Senda et al. . |
| 4,766,300 | 8/1988 | Chadima, Jr. et al. . |
| 4,835,615 | 5/1989 | Taniguchi et al. . |
| 4,877,949 | 10/1989 | Danielson et al. . |
| 4,952,966 | 8/1990 | Ishida et al. . |
| 4,962,432 | 10/1990 | Ohtsuka et al. . |
| 4,996,413 | 2/1991 | McDaniel et al. . |
| 5,010,580 | 4/1991 | Vincent et al. . |
| 5,019,699 | 5/1991 | Koenck . |
| 5,025,319 | 6/1991 | Mutoh et al. . |
| 5,080,456 | 1/1992 | Katz et al. . |
| 5,083,150 | 1/1992 | Nagasaki et al. . |

(List continued on next page.)

FOREIGN PATENT DOCUMENTS

| | | |
|---|---|---|
| 60-129891 | 7/1985 | Japan . |
| 63-67692 | 3/1988 | Japan . |
| 63-83886 | 4/1988 | Japan . |
| 60-264383 | 10/1990 | Japan . |
| 3-198175 | 8/1991 | Japan . |
| 5-242287 | 9/1993 | Japan . |
| 6-162247 | 6/1994 | Japan . |

OTHER PUBLICATIONS

PCT International Search Report dated Sep. 18, 1996 (two pages).
PCT International Search Report date Nov. 7, 1996 (one page).

*Primary Examiner*—Harold Pitts
*Assistant Examiner*—Mark Tremblay
*Attorney, Agent, or Firm*—Watts, Hoffmann, Fisher & Heinke Co., LPA

[57] ABSTRACT

An extended working range dataform reader with reduced power consumption having a camera assembly and a circuit control board including game control circuitry and exposure control circuitry configured to set an initial gain value and an initial exposure period, respectively, resulting from a previous dataform reading session. Subsequent fields of image data are captured by the camera which are used to correct the gain and exposure relative to the initial values for gain and exposure period, thereby reducing the latency period for realizing correct values and reducing power consumption during power up. Furthermore, the gain control system and the exposure control system each utilize an open loop feedback such that successive fields of image data captured by the camera are utilized to calculate correct values, thereby reducing the latency time for realizing a correct value. Additionally, a reader module is provide for use in a dataform reader that emulates a laser module such that the dataform reader module can be readily integrated into existing laser-based dataform reading systems. Preferably, laser model emulation circuitry included in the dataform reader module emulates output of a laser scan module and a control circuit board in which the emulation circuitry is realized has an output port constructed and arranged to communicate with devices configured for use with a laser scanner.

1 Claim, 9 Drawing Sheets

U.S. PATENT DOCUMENTS

| | | |
|---|---|---|
| 5,128,769 | 7/1992 | Aria et al. . |
| 5,130,520 | 7/1992 | Shepard et al. . |
| 5,131,053 | 7/1992 | Bernzott et al. . |
| 5,168,149 | 12/1992 | Dvorkis et al. . |
| 5,184,005 | 2/1993 | Ukai et al. . |
| 5,187,356 | 2/1993 | Chadima, Jr. et al. . |
| 5,200,597 | 4/1993 | Eastman et al. . |
| 5,210,398 | 5/1993 | Metlitsky . |
| 5,235,167 | 8/1993 | Dvorkis et al. . |
| 5,237,365 | 8/1993 | Miyazawa . |
| 5,243,666 | 9/1993 | Hasfeave et al. . |
| 5,245,445 | 9/1993 | Fujisawa et al. . |
| 5,258,604 | 11/1993 | Behrens et al. . |
| 5,262,871 | 11/1993 | Wilder et al. . |
| 5,272,538 | 12/1993 | Homma et al. . |
| 5,276,315 | 1/1994 | Surka . |
| 5,278,397 | 1/1994 | Barken et al. . |
| 5,280,162 | 1/1994 | Marwin ................................. 235/455 |
| 5,291,009 | 3/1994 | Roustaei . |
| 5,293,238 | 3/1994 | Nakano et al. . |
| 5,296,690 | 3/1994 | Chandler et al. . |
| 5,308,960 | 5/1994 | Smith et al. . |
| 5,308,966 | 5/1994 | Danielson . |
| 5,309,243 | 5/1994 | Tsai . |
| 5,314,631 | 5/1994 | Katoh et al. . |
| 5,315,095 | 5/1994 | Maron et al. . |
| 5,319,181 | 6/1994 | Shellhammer et al. . |
| 5,321,245 | 6/1994 | Kazumi ................................. 235/455 |
| 5,331,143 | 7/1994 | Maron et al. . |
| 5,332,892 | 7/1994 | Li et al. . |
| 5,340,973 | 8/1994 | Knowles et al. . |
| 5,345,266 | 9/1994 | Denyer . |
| 5,349,172 | 9/1994 | Roustaei . |
| 5,352,884 | 10/1994 | Petrick et al. . |
| 5,354,977 | 10/1994 | Roustaei . |
| 5,359,185 | 10/1994 | Hason . |
| 5,378,883 | 1/1995 | Batterman et al. ...................... 235/455 |
| 5,386,271 | 1/1995 | Maekawa et al. . |
| 5,401,949 | 3/1995 | Ziemacki et al. . |
| 5,406,063 | 4/1995 | Jelen . |
| 5,408,084 | 4/1995 | Brandorff et al. . |
| 5,414,251 | 5/1995 | Durbin . |
| 5,418,357 | 5/1995 | Inoue et al. . |
| 5,420,635 | 5/1995 | Konishi et al. . |
| 5,420,943 | 5/1995 | Mak . |
| 5,448,293 | 9/1995 | Kogane et al. . |
| 5,468,947 | 11/1995 | Danielson et al. . |
| 5,468,950 | 11/1995 | Hanson . |
| 5,468,951 | 11/1995 | Knowles et al. ......................... 235/455 |
| 5,478,997 | 12/1995 | Bridgeall et al. . |
| 5,484,994 | 1/1996 | Roustaei . |
| 5,486,688 | 1/1996 | Iima et al. . |
| 5,496,992 | 3/1996 | Madan et al. . |
| 5,504,316 | 4/1996 | Bridgall et al. . |
| 5,534,684 | 7/1996 | Danielson ............................... 235/462 |
| 5,559,555 | 9/1996 | Shimzu et al. . |

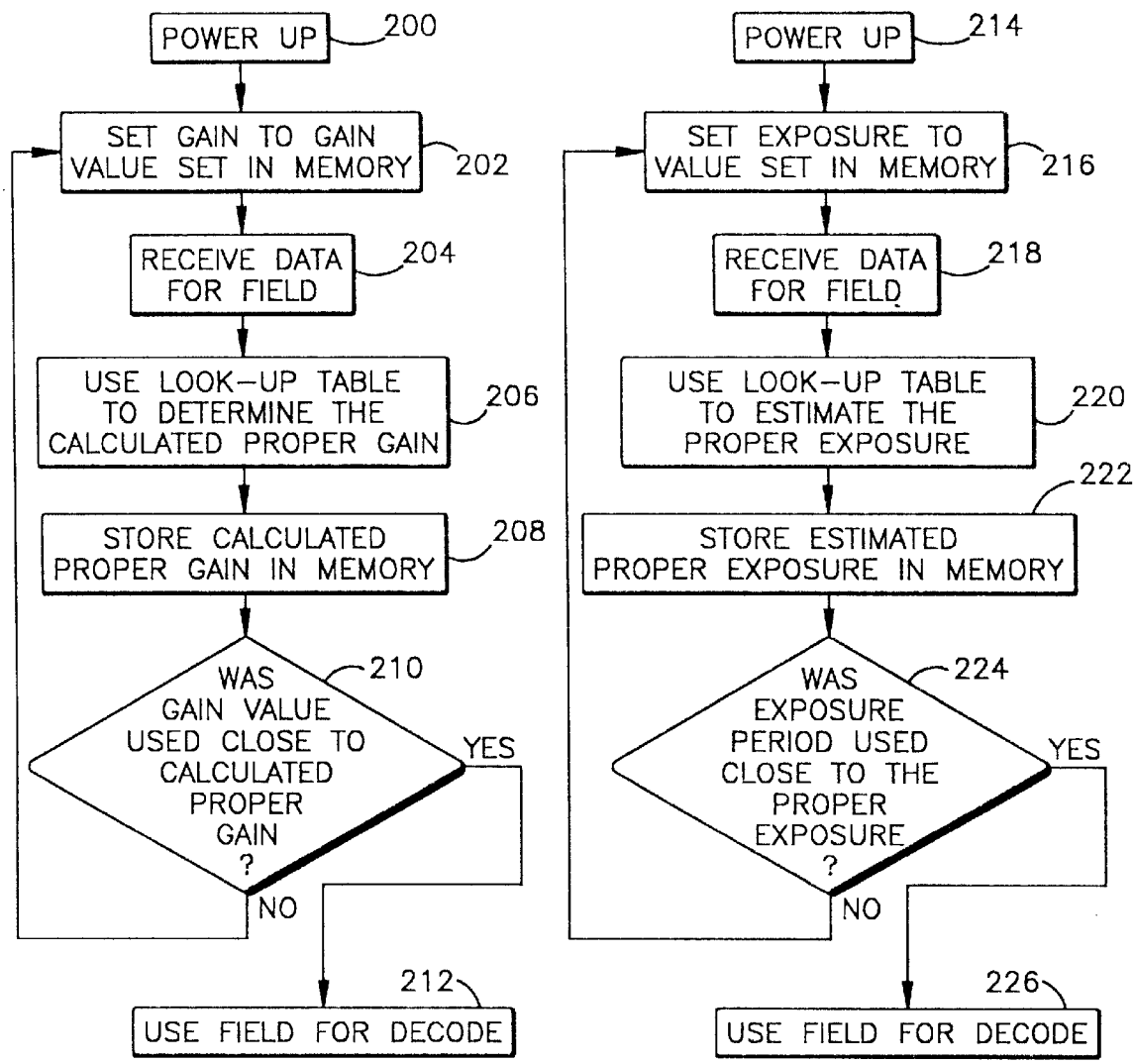

EXTENDED WORKING RANGE DATAFORM READER WITH REDUCED POWER CONSUMPTION

CROSS-REFERENCE TO RELATED APPLICATIONS

This is a divisional of application Ser. No. 08/507,607 filed on Jul. 25, 1995 which is a continuation-in-part of application Ser. No. 08/494,435 filed Jun. 26, 1995, now U.S. Pat. No. 5,780,833, and application Ser. No. 08/332,592, filed Oct. 31, 1994 now U.S. Pat. No. 5,521,366, and application Ser. No. 08/280,489 filed Jul. 16, 1994, now U.S. Pat. No. 5,572,006.

TECHNICAL FIELD

The invention relates to dataform readers and methods for reading dataforms including barcodes, such as 1D and 2D codes, and other dataforms such as matrix codes. More particularly, the invention relates to dataform readers and methods which achieve high resolution imaging of the dataforms with reduced power consumption.

BACKGROUND OF THE INVENTION

A. Background of Dataforms

The application and use of bar codes and matrix codes are well known and growing. Bar codes and matrix codes are forms of "dataforms", which for present purposes are defined to include all arrangements whereby data is fixed in some form of machine readable copy. Thus, dataforms include one and two dimensional bar codes (e.g. UPC, C1 28, PDF417, etc.), matrix codes (e.g. Maxicode, Data Matrix, Code 1, etc.) and graphic codes, as well as words and numbers and other symbols, which may be printed or etched on paper, plastic cards and metallic and other items. Dataforms may be printed in invisible ink, magnetically recorded via magnetic stripes or magnetic ink fonts, electromagnetically recorded via RF tags, engraved, stamped, tattooed (on skin), formed by ion doping (for semiconductor wafers) or biochemical binding, etc.

In the utilization of dataforms, data originally encoded is recovered for further use in a variety of ways. For example, a printed bar code may be optically scanned to derive reflectance values which are digitized, stored in buffer memory and subsequently decoded to recover the data encoded in the bar code. Regardless of the particular type of dataform, an image is typically acquired and stored as pixel values for further processing. An image of a bar code or matrix code existing as a graphic image can be acquired by use of a CCD reader, a laser scanner or other suitable device which is capable of distinguishing between different reflective values of light reflected data cells and synchronizing the data cell format for a particular dataform. Thus, for example; a bar code typically comprises black or dark colored bar type elements printed on a white or light colored background area, with white or light colored spaces between the elements of the bar code. The spaces are typically the same color as the background area, but may be of a different light color in this example. In other examples the elements of a bar code or matrix code are white or light colored and are defined by black or darker colored spaces and background area.

In other applications, such as laser engraving on silicon wafers, illumination may result in a dark on light relationship in one orientation and a light on dark relationship in a different orientation. In addition to pixel values representing reflective values of light ("light" being defined as encompassing the entire electromagnetic spectrum for present purposes), in other arrangements pixel values representative of reflective values may be based upon reflection of sound waves or other mediums from a dataform of an appropriate configuration. In any arrangement in which a dataform is arranged to be read on the basis of reflective values, such reflective values may typically be stored as pixel values in an image buffer memory or other storage medium in bit map or other form which, while representative of pixel values for an image, may utilize any appropriate data storage format.

B. Background of Dataform Reader

Current art portable terminals with integrated laser barcode scanner modules or 1-dimensional CCD barcode reader modules are not well suited for reading two dimensional dataforms. Laser barcode scanners operate by projecting a narrow laser beam of light which forms an intensely illuminated spot on the barcode. Oscillating mirrors continually redirect the laser beam so that the spot moves in a sweeping pattern or a raster pattern. Generally a sweeping pattern refers to oscillation of the beam along the horizontal axis without any vertical oscillation. A raster pattern refers to a rapid oscillation along the horizontal axis and a slower oscillation along the vertical axis so that raster pattern appears to be a sweeping pattern moving up and down. A photodetector collects illumination from the entire target area. When the moving, or flying spot is incident on a highly reflective portion of the barcode, such as a white background, light reflected from the spot is incident on the photosensor. When the flying spot is incident on a less reflective portion of the barcode, such as a black bar, less light is reflected towards the photodetector.

A laser scanner does not have an internal synchronization mechanism. The laser scanner calculates the laser spot's relative horizontal position based on known self-synchronizing patterns in the 1D barcode. This can be referred to as a code self-synchronized system. A raster pattern laser scanner can read 2D stacked barcode such as PDF-417 because PDF-417 has particular row indicator patterns which are recognizable and used by the scanner for vertical synchronization. This system has very little rotation angle tolerance, because the scanner can not recognize a row indicator pattern or other codeword pattern unless the spot sweeps across the entire pattern.

A laser scanner can not read 2D matrix codes such as the Maxicode and the Datamatrix because such codes do not have row indicator patterns for vertical synchronization.

The 1-dimensional CCD reader operates by imaging a long and thin target area onto a one-dimensional photodetector array rather than scanning a spot of illumination across the barcode symbol. If the reader is positioned relative to a 1D barcode so that the imaged target area falls relatively across the barcode, then the barcode can be decoded based on the run-length sequences of grayscale values derived from the pixels on which each bar and space of the code is imaged. Similar to the laser scanner, the 1D CCD has no vertical synchronization and must rely on row indicator patterns for vertical synchronization.

More recently, the CCD reader concept has been extended to two-dimensional CCD readers such as the TEC contact reader made by Tokyo Electric Company. A two dimensional CCD reader images an area onto a two-dimensional array of photodetectors. Such a device is capable of reading matrix codes because the 2-dimensional pixel array provides both horizontal and vertical synchronization. This reader is too large and bulky for practical use in a portable terminal.

Furthermore, the device consumes too much power for battery powered portable use.

Current 2-dimensional CCD readers have an image capture system that includes a board camera which continually produces a composite video signal representative of the target area. When a reading session begins, a portion of the video signal is selected for decoding.

Because the board camera continually generates a video signal, it consumes approximately 1–2 watts of power. Such consumption would drain typical batteries in less than 1 hour of operation.

Current image capture configurations do not provide for the board camera to be shut down between reading sessions. Current art board cameras require over 600 ms latency time to generate a gain corrected and properly exposed composite video signal after power up. Most of the time is required to automatically adjust the gain control and exposure period through closed loop analog feed back circuitry. Therefore, if each read session required powering up the board camera, the read session would be longer than 600 ms. Because of customer expectations for a rapid response time, a read session should be under 300 ms. Therefore the board camera can not be shut down between read sessions.

Current art gain control systems include an analog integration circuit that receives the analog video signal from the photosensor array and generates a voltage signal. The voltage signal is input to analog gain adjustment circuitry which adjusts the gain amplifier accordingly. Closed loop analog circuits require in excess of 500 ms from power up to reach equilibrium wherein a gain corrected signal is produced.

Current art exposure control systems also include an analog integration circuit that receives the analog video signal from the photosensor array. The output signal is input to exposure timing circuitry which adjusts the exposure period for the sensor array. The exposure control system also requires in excess of 500 ms from power up to reach equilibrium and properly expose the sensor array.

Current art video camera image capturing systems including the analog integration circuit are specifically designed to eliminate any abrupt changes in the video signal since abrupt changes are not desirable when viewed by human users. To this end, the typical analog integration circuitry produces a corresponding voltage signal from the received analog video signal.

Therefore, there is a need to have a 2-dimensional imaging based dataform reader module with a rapid response time. There is also a need to have such reader module be low power consumption and include an image capture configuration that enables the board camera to be powered with a small latency time so that it can be powered down between read sessions.

Furthermore, there is a need to have such module be of a size and shape comparable to current laser scanners so that it is mechanically retrofittable into devices that currently include a laser scanner. Further yet it is desirable that such reader module be electrically compatible with current laser scanners so that it is electrically retrofittable into devices that currently include a laser scanner.

There is also a need to have a portable data collection system which includes the module for reading dataforms. It is desirable that such system be small, light weight, have low power consumption and overcome other drawbacks of prior art devices.

SUMMARY

In accordance with this invention a portable dataform reader module is provided with a size and shape comparable to current laser scan modules. The reader includes a board camera that is turned off between dataform reading sessions to achieve low power consumption. To provide an adequate response time, the reader in accordance with this invention includes open loop gain control circuitry that provides an initial gain setting (after power up) equal to the gain setting stored in a memory from the previous read session. After capturing the first field of image data, the correct gain is calculated. If the gain value is used and the correct value is close, then image field is used for decoding. If not close, a new field is captured with the correct setting. In either case, the most recent correct value is stored in memory for later use. This system provides for correct gain being achieved within 1–3 fields after power up corresponding to a 50 ms latency time.

Also in accordance with invention, an open loop exposure control system is provided. The system provides an initial exposure period equal to the exposure period stored in memory from the previous read session. After capturing the first field of image data, the correct exposure is calculated. If the exposure period is used and the correct value is close, then image field is used for decoding. If not close, a new field is captured with the correct setting. In either case, the most recent correct value is stored in memory for later use. This system provides for correct exposure being achieved within 1–3 fields after power up corresponding to a 50 ms latency time.

Also in accordance with this invention, an open loop exposure control system is provided which sets the exposure period to the period used for the most recent read session at power up. Again, if incorrect, the system provides an incremental adjustment so that proper exposure can be obtained within 1 to 3 fields after power up.

Also in accordance with this invention, the reader includes a large F# optic assembly that provides a working range from about 2.5" to at least 8.5" in front of the reader while maintaining a broad field of view. The reader is capable of capturing a high signal to noise ratio image in under 0.01 seconds thereby making the reader highly tolerant to hand jitter. To accommodate the large F# optic and short exposure period, the reader is provided with an efficient high intensity uniform illumination module.

An illumination module secured to the front surface of the reader housing to avoid the illumination loss problem and the internal reflection illumination noise problem associated with placing the illumination source behind a window within the reader housing.

The illumination module includes a printed circuit board assembly including a plurality of surface mount LEDs secured to the front side of a printed circuit board. The board is bonded into a cavity in the backside of a durable acrylic lens array. The lens array operates to direct uniform and intense illumination towards a target area in front of the reader.

In the preferred embodiment, the illumination module has an aperture in the center and the reader module is positioned to gather light reflected from the target area through the aperture. This configuration assures illumination directed from the lens array of the reader module is aligned with the field of view of the reader module.

In one aspect of this invention, the reader module includes circuitry that emulates the output of a laser scan module making it retrofitable into devices that current include a laser scanner.

In another aspect of this invention a data collection system is provided that includes the reader module in accordance with this invention. The dataform reading system is intended for complete portable use and includes a spread spectrum radio which operates to couple the reader with a computer throughout an IEEE 802.11 compatible network. The spread spectrum radio can be used to transmit decoded dataform data, photographic image data in a compressed format, or compressed data files representing voice messages.

Also in accordance with this invention, the dataform reader includes user interface devices such as a keyboard, display, touch panel, microphone and speaker which operate with various circuits to improve the functionality of the reader.

For a better understanding of the invention, together with other and further objects, reference is made to the accompanying drawings and the scope of the invention will be pointed out in the accompanying claims.

BRIEF DESCRIPTION OF THE DRAWINGS

Preferred embodiments of the invention are described below with reference to the accompanying drawings, which are briefly described below.

FIG. 2 shows a flowchart of the operation of the open loop gain control 25 system in accordance with this invention.

FIG. 3 shows a flowchart of the open loop exposure control system in accordance with this invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
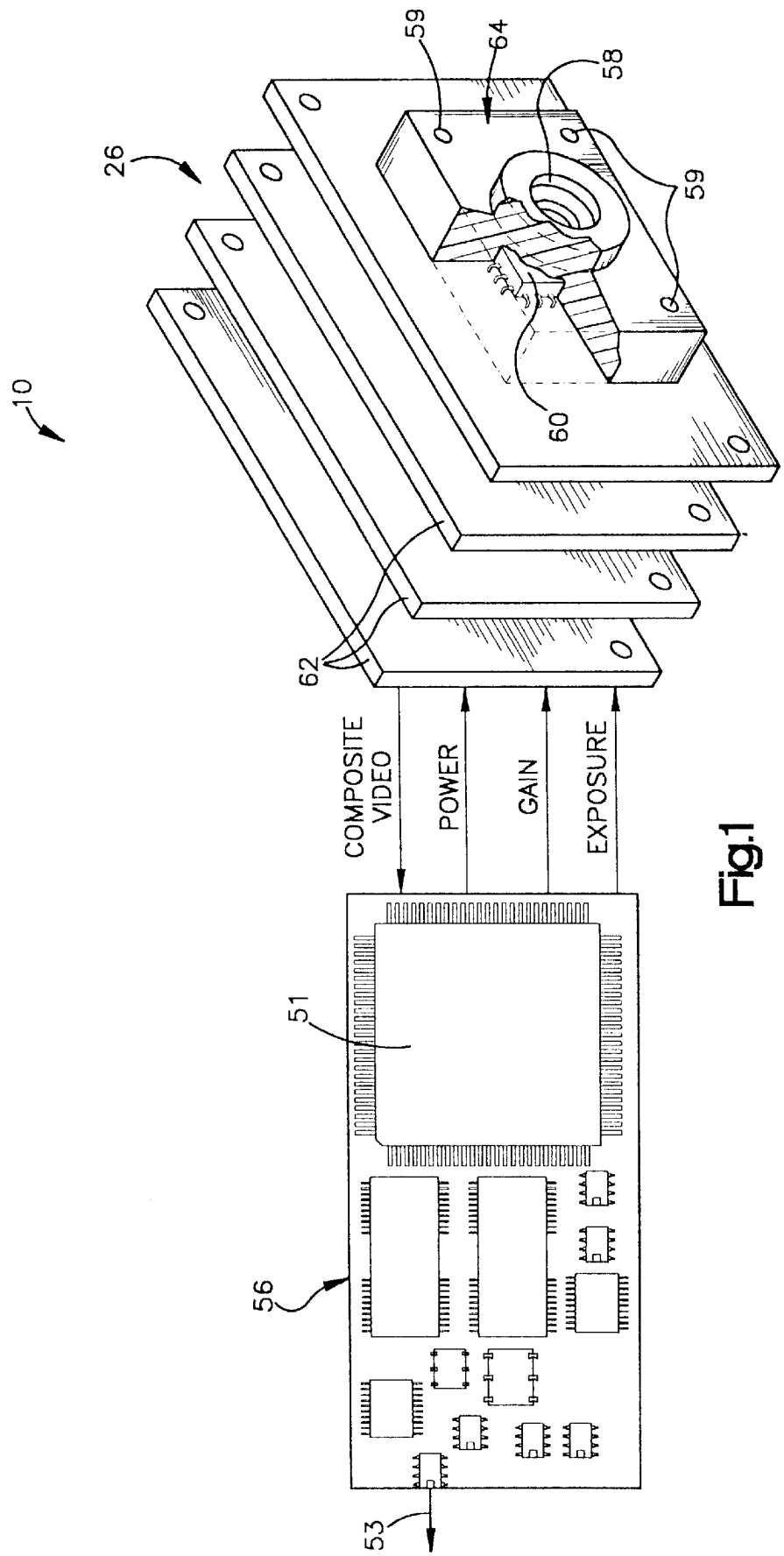
FIG. 1 shows a perspective view of a dataform reader module in accordance with this invention.

The dataform reader module 10 of this invention is shown generally in FIG. 1. The module includes camera assembly 26 and control and decoder board 56. The camera assembly 26 comprises a board camera assembly (shown as a three board assembly) 62 which includes a two dimensional photosensor array 60. The camera assembly 26 also includes an optic assembly 58 for focusing an image of a dataform in a target area onto the sensor array 60 and camera housing 64 which shrouds ambient light from the photosensor array 60 and positions the optic assembly 58 such that the photosensor array is substantially at the image plane.

The board camera 62 includes an input port for a power signal which provides operating power for generating a composite video signal. An additional gain input port is connected to the gain adjustment circuitry to bypass the analog gain circuitry and an additional exposure input port is connected to the exposure timing circuitry to bypass the analog exposure control circuitry. The control and decoder board 56 includes digital gain control circuitry which may be embodied in code executed by the microprocessor 51.

FIG. 2 shows a flow chart of the operation of the gain control circuitry. Box 200 represents initial power up of the board camera. At power up, the gain control circuitry sets the gain value to the gain setting used during the previous dataform reading session 202. The gain circuitry will provide a digital value to an Digital-to-Analog (D/A) converter which supplies a voltage signal to the gain adjustment circuitry on the board camera. Box 204 represents the capture of a field of image data. Based on the gain value used and the resultant field of image data, a correct gain value is calculated based on a look up table at 206. The new value is stored in memory for the next field capture at 208. If the difference between the gain value used and the calculated value is less than a threshold at 210, the field is used for decoding at 212. Alternatively, if the difference is greater than the threshold, then the system returns to 202 to capture another field at the calculated value. Because the gain control system provides an initial gain setting tied to a previously correct gain setting and for incrementally adjusting the gain value after evaluation of a field of image data, a gain corrected video signal can be achieved in 1–3 fields after power. This corresponds to a 10–50 ms latency time.

The control and decoder board 56 also includes digital exposure control circuitry which may be embodied in code executed by the microprocessor. FIG. 3 shows a flow chart of the operation of the exposure control circuitry. Box 214 represents initial power up of the board camera. At power up, the exposure control circuitry sets the exposure period to the period stored in memory from the previous dataform reading session 216. The exposure control circuitry will provide a digital value to a D/A converter which supplies voltage signals to the exposure adjustment circuits on the board camera. Box 218 represents the capture of a field of image data. Based on the gain value used and the resultant field of image data, a correct exposure period is calculated based on a look up table at 220. The new value is stored in memory for the next field capture at 222. If the difference between the exposure period used and the calculated value is less than a threshold at 224, the field is used for decoding at 226. Alternatively, if the difference is greater than the threshold, then the system returns to 216 to capture another field at the calculated value. Because the exposure control system provides an initial exposure setting tied to a previously correct exposure setting and for incrementally adjusting the exposure period after evaluation of a field of image data, a properly exposed video signal can be achieved in 1–3 fields after power. This corresponds to a 10–50 ms latency time.

Referring again to FIG. 1, the control and decoder board 56 also includes image processing circuitry, embodied in code operable by microprocessor 51, which is operative to decode the dataform in the image area. An appropriate decoder system is described in U.S. patent application Ser. No. 08/443,909, filed May 17, 1995, and U.S. patent application Ser. No. 08/456,113, filed May 31, 1995, the contents of both applications are hereby incorporated by reference. Other decoder systems known in the art are also contemplated by this invention. The decoded results are made available to other processing circuitry (discussed later) through a data transfer link 53.

The control and decoder board 56 further includes laser module emulation circuitry embodied in code executable by microprocessor 51. The emulation circuitry operates to encode the decoded results in a standard 1-dimensional barcode format, such as code 39, and output a square wave signal emulating the square wave signal of a laser scanner module scanning the 1-dimensional code. It should be appreciated that this feature provides for electrical compatibility with a laser scanner module while providing the capability of reading an assortment of dataforms including 2-dimensional matrix codes. When operating in laser emulation mode, the square wave signal is made available for further processing through data transfer link 53.

In yet another embodiment, because the dataform reader module 26 captures an image of the target area, the device, in addition to capturing the image of a dataform, can be used to photograph an object in the target area. For example, an operator can use the reader module to photograph a damaged product and also capture an image of a dataform associated with the damaged product. When a photograph image is captured, the decoder board will transfer a digital image, such as a bit map, of the image via data transfer link 53. While FIG. 1 shows the reader module of this invention embodied in a camera assembly 26 and a control and decoder board 54, FIG. 14 shows a single board embodiment. This embodiment provides for a much shallower module with a larger frontal form factor which is useful for using the reader module in a relatively flat pen type of computer.

Figure 4:
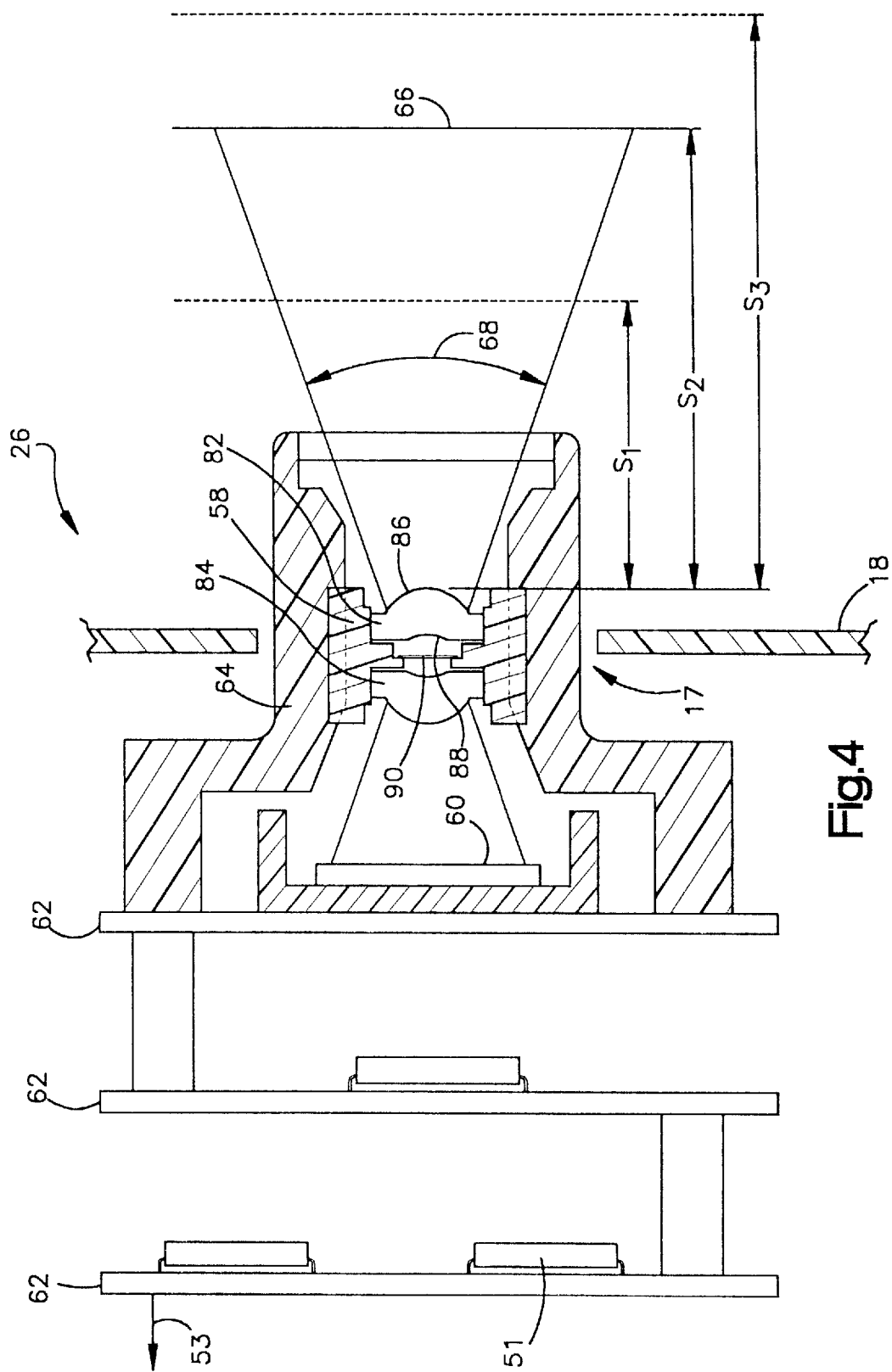
FIG. 4 shows a diagrammatic top view of the reader module in accordance with this invention.

While FIG. 1 shows the reader module 10 of this invention embodied in a camera assembly 26 and a control and decoder board 56, FIG. 4 shows the cutaway top view of camera assembly 26 with microprocessor 51, data transfer link 53, and associated circuitry for performing the open loop gain control, open loop exposure control, decoding and other above mentioned functions integrated into the board camera assembly 62.

The performance of the dataform reader module is enhanced by providing an optic system with an extended working range. Based on the position between the optic assembly and the photosensor array, there exists a best focus position S2 in front of the optic assembly 58 at which an image of the object in the object field 66 will be sharpest on the sensor array 60. The image gradually degrades as the object is moved towards the near field cut off distance S1 and a far field cut off distance S3. The optic assembly 58 also has a field of view 68 which is wide enough to image large dataforms at the far field S3 and still provide a large image of a small dataform located at the near field S1. In the preferred embodiment the optical assembly 58 has a working range from about 2.5" to at least 8.5" from the front surface of the optical assembly 86, with best focus distance being at 5.5". The preferred field of view corresponds to a target surface 5 inches long by 3.75 inches wide at 8.5" from lens surface 86.

An optical system that will meet these performing requirements include a symmetrical lens structure. Two substantially identical lenses 82 and 84 will be positioned with mirrored symmetry about the aperture 90. Surface 86 is aspherical having a magnitude and shape defined as an even asphere having a radius of curvature of 1.5298 mm, a conic constant of −0.019890, a 6th order aspheric deformation coefficient of 0.0096 mm, an 8th order coefficient of −0.0057, and a 10th order coefficient of 0.0023. The surface 88 is a spherical surface with a radius of curvature of 1.6004 mm. The aperture 90, measures 0.3606 mm and is positioned between the lenses 82 and 84 as shown to provide the optical assembly an F# 13. The lens diameter is not critical to this invention. A more detailed discussion of the optic system of this invention can be found in U.S. patent application Ser. No. 08/494,435, entitled "Extended Working Range Dataform Reader", filed Jun. 26, 1995, and assigned to the same assignee as the present invention, the contents of which, is hereby incorporated by reference.

Because the optic assembly is used in a portable reader, it is desirable that the assembly be light weight and impact resistant. In the preferred embodiment, the optical material used for fabricating the lens element is plastic. A plastic optic will reduce the weight of an equivalent glass assembly by 60% and provide a system much more impact resistant. Another benefit of plastic optics is that the costs associated with grinding aspherical surfaces on glass optics is avoided. An aspherical surface is easily formed by injection molding a plastic optic. While the above optic system provides the desired attributes of the invention, those skilled in the art are able to provide other optics with similar performance characteristics.

Because the desired working range and field of view of the reader of this invention dictate that the optic system must have a large F# (F# 5.6 or greater), the photosensor array exposure period and illuminator system for the reader must provide for adequate exposure of the photosensor array. To reduce the hand jittering effect, the exposure period must be 0.01 seconds or less, which is substantially less than current CCD readers. Therefore, the illumination system of this invention must provide adequate illumination to accommodate the large F# and short exposure time.

Proper exposure of the sensor array requires an object field illumination of 0.3 lux assuming an exposure period of 0.03 seconds and an F# 1.2. To determine the proper object field illumination of the preferred embodiment for a 0.01 second exposure period and an F# 1 3, the following formula is used:

$$\frac{(\text{Illumination intensity})(\text{Exposure period})}{(F\#)^2} = \text{Constant}$$

Therefore, the minimum required object field illumination for the reader of this invention is 106 lux at the far field cut off distance.

Figure 5:
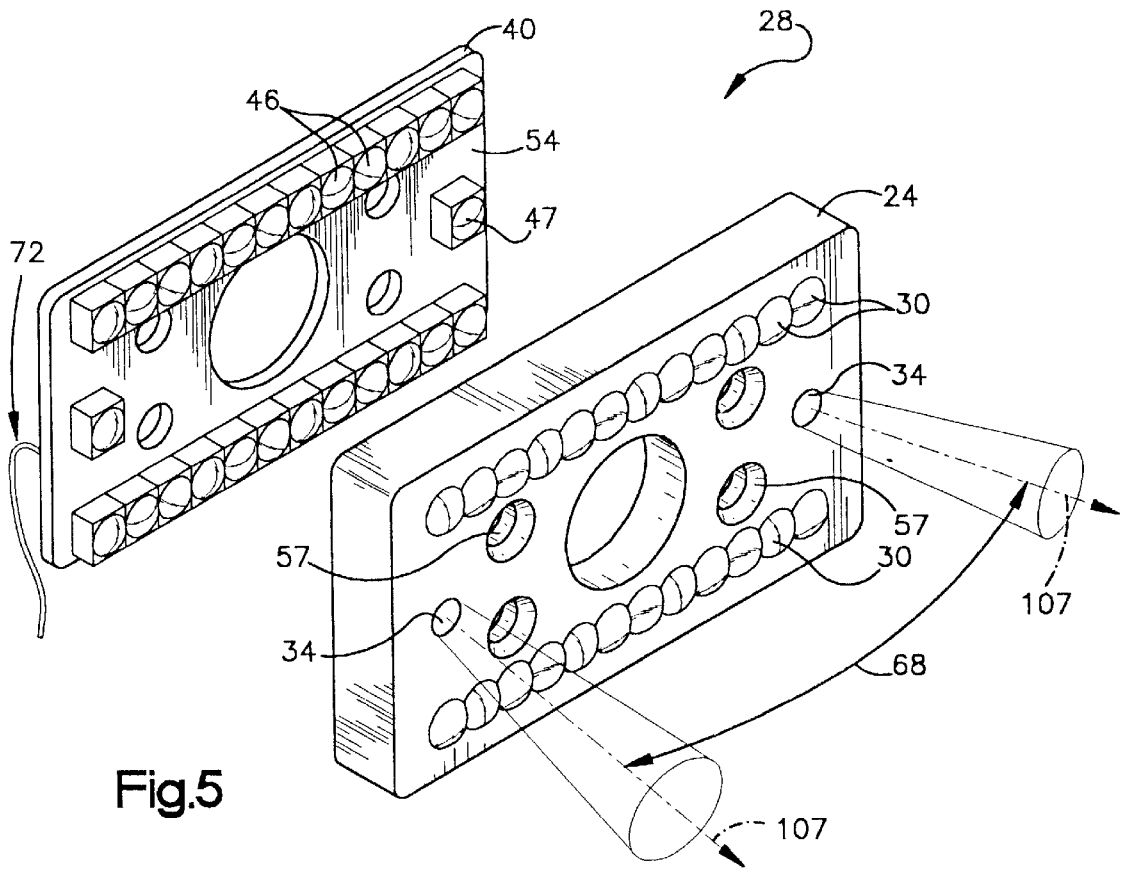
FIG. 5 shows an exploded perspective view of the illumination module of this invention.

Referring to FIG. 5, which is a perspective explosion view of the illumination module 28, it can be seen that module 28 includes a lens array 24 and a printed circuit board assembly 40. The printed circuit board assembly 40 includes a plurality of surface mount LEDs 46 secured to a printed circuit board 54. Printed circuit board 54 includes printed conductors and power lead 72 operative for supplying power to the LEDs 46. A suitable surface mount LED is produced by the Marktech Corporation of Latham, N.Y., as Part No. MTSM735K-UR or MTSM745KA-UR. Each provides illuminosity of 285 mcd over an illumination field of about 68°. The small footprint of the LED 46 provides for twelve to be placed in a row measuring less than 1.5". The printed circuit board assembly 54 includes 24 LED 46 in two rows providing 6840 mcd of uniform illumination over a 68° field.

The lens array 24 includes a plurality of exposure illuminator lens elements 30 all of which are positioned in front of an LED 46. The exposure illuminator lens elements 30 direct the 68° field of illumination from each LED into a smaller uniform illumination field corresponding to the field of view of the optic (about 50°).

Figure 6:
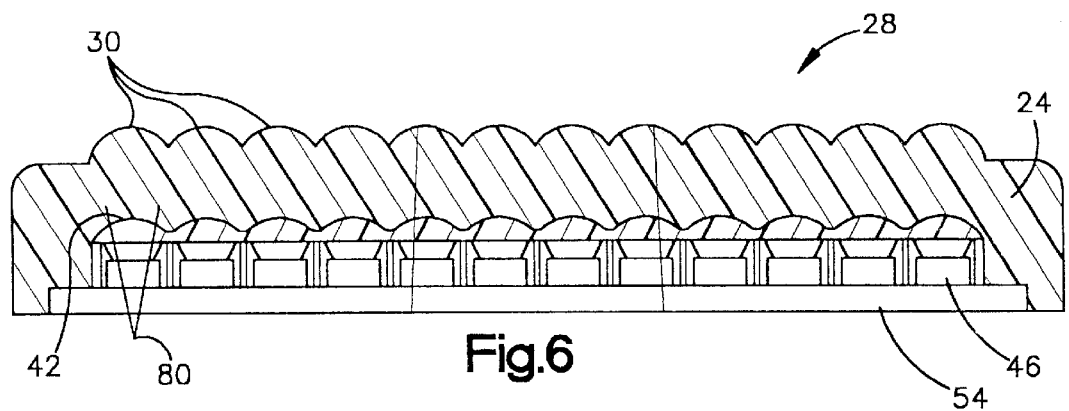
FIG. 6 shows a side cross sectional view of the illumination module of this invention.

Referring to FIG. 6 which shows a cross section of the assembled illumination module 28, it can be seen that each exposure lens cell 30 has an inner lens surface 42 and a focal point 80. By locating the LED between the focal point 80 and the interior surface 42, the lens cell acts as a light directing element rather than an imaging element thereby avoiding hot spots in the target area and providing a highly uniform illumination. The 68° field of illumination from each LED 46 is gathered by each lens cell 30 and directed into a field corresponding to the optical system field of view which is smaller than 68°. Furthermore, because lens cells 30 overlap, there is "cross talk" between the optical surfaces such that illumination from one LED may be directed towards the target area by a cell associated with another LED. 6840 mcd of illumination, over an illumination field corresponding to the optic field of view, will provide an illumination intensity in excess of 106 lux at the far field cut-off distance of 8.5".

Referring back to FIG. 5, two targeting lens elements 34 positioned over two targeting LEDs 47 project two pencils of targeting illumination 107, forming hot spots, into the target area at angles corresponding to the optical systems field of view 68. The hot spots are visible to the operator and facilitate positioning of the portable dataform hand held reader so that the target dataform is within the field of view of the optical system.

The lens array 24 forms the front surface of the illumination module protecting the printed circuit board assembly 40 from physical impact as well as from dirt, moisture and other harmful elements found in the environment. Therefore, the lens array 24 is preferably molded of an impact resistant acrylic or other suitable material that has a high illumination transmittivity and durability necessary for the environment in which a portable hand held dataform reader is operated. To further protect the printed circuit board assembly 40 from harmful elements in the environment, a conformal coating is applied to the board assembly 40 and the assembly is bonded into a cavity in the back of the lens array 24 with a cynoacrolate, UV curing or structural adhesive.

Referring to FIGS. 5 and 1, the illumination module 28 may be secured to the front of the camera housing 64 by inserting four screws through the four holes 57 in the reader module and threading them into the co-axially aligned holes 59 in the camera housing 64.

Figure 7:
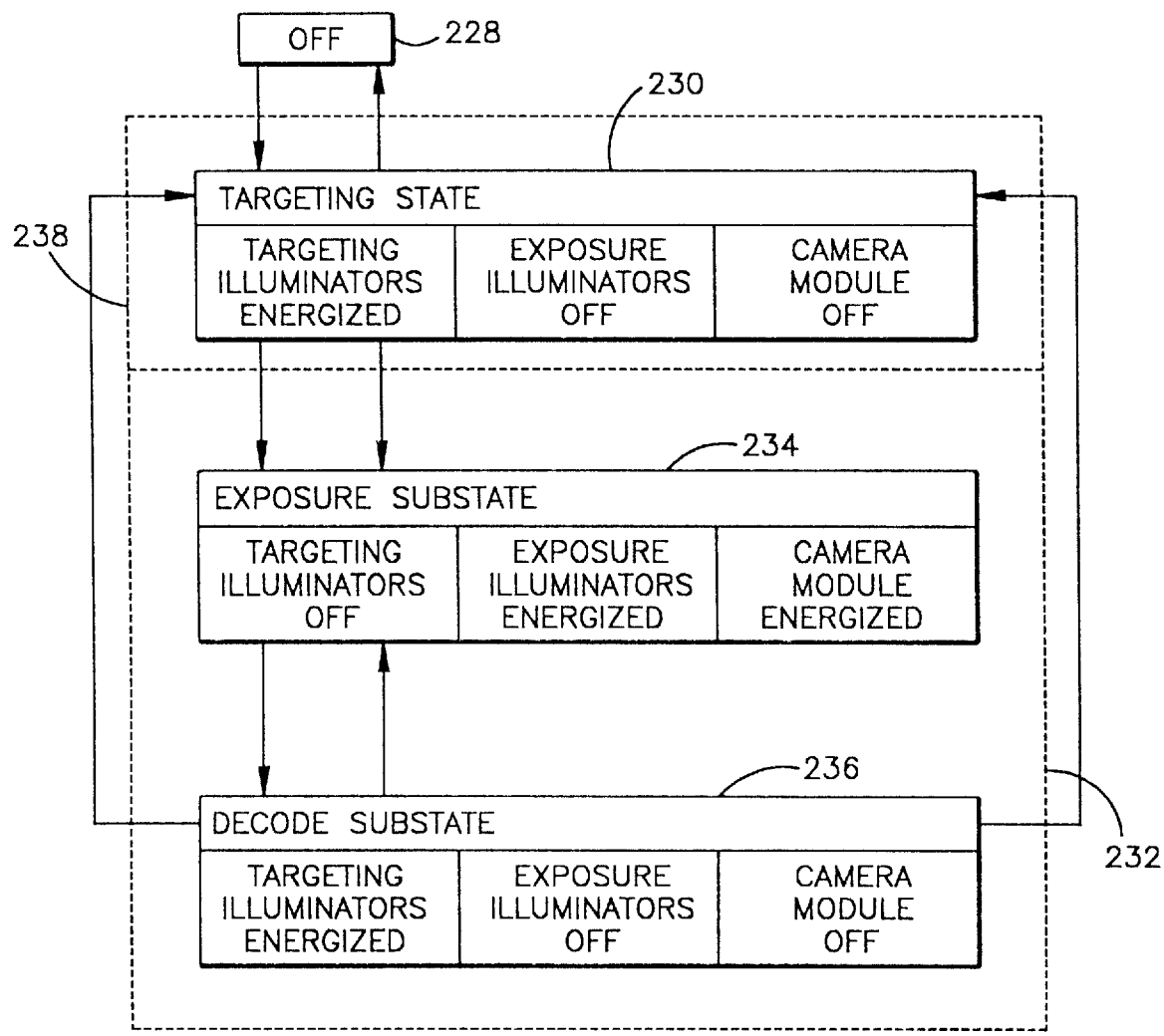
FIG. 7 shows a state chart of the operation of the power control circuitry in accordance with this invention.

Because the reader module 10 is designed for use in portable data collection systems, the module includes power savings circuitry designed to operated with a two position manually activated trigger. The trigger may be either a two position trigger (released and pulled) or a three position trigger (released, first position and second position). The circuitry controls operation of the board camera 62 and the illumination module 28 during a read session. FIG. 7 shows a state chart representative of the power control circuitry. When in the off state 228 power is not supplied to either the illumination module or the board camera.

When the three position trigger is pulled to the first position, the system moves to the targeting state 230. In the targeting state, the microprocessor provides for the targeting illuminators to be on and the board camera and exposure illuminators to be off. When the trigger is pulled to the second position, the system enters the dataform read state 232. The dataform read state has two sub-states, exposure 234 and decode 236. In the exposure state 234, the targeting illuminators are off while the exposure illuminators and board camera are operational. After capture of an image, the system enters the decode sub-state 236, wherein, the exposure illuminators and board camera are off while the targeting illuminators are on to assist the operator in holding the reader in position in case a second image needs to be captured. If a successful decode occurs, the system returns to the off state 228. If the trigger is released, the system returns to the targeting state 230 and off state 228. A time out can also cause the system to return to the off state without a successful decode.

If the system only has a two position trigger, the system can operate in two embodiments. In the first embodiment, a trigger pull causes the system to enter the targeting state 230. Releasing the trigger causes the system to enter the dataform read state 234. The exposure sub-state 234 and the decode sub-state 236, operate similar to the three position trigger embodiment. A time out will cause the system to return to the off state.

Alternatively, a trigger pull may cause the system to enter a fully automatic read state 238. The system will automatically enter targeting sub-state 230 for a period of time and then enter the dataform read state 232. Operation of the dataform read state is the same as the above discussed embodiments. A trigger release will cause the system to return to the off state 228.

Figure 8:
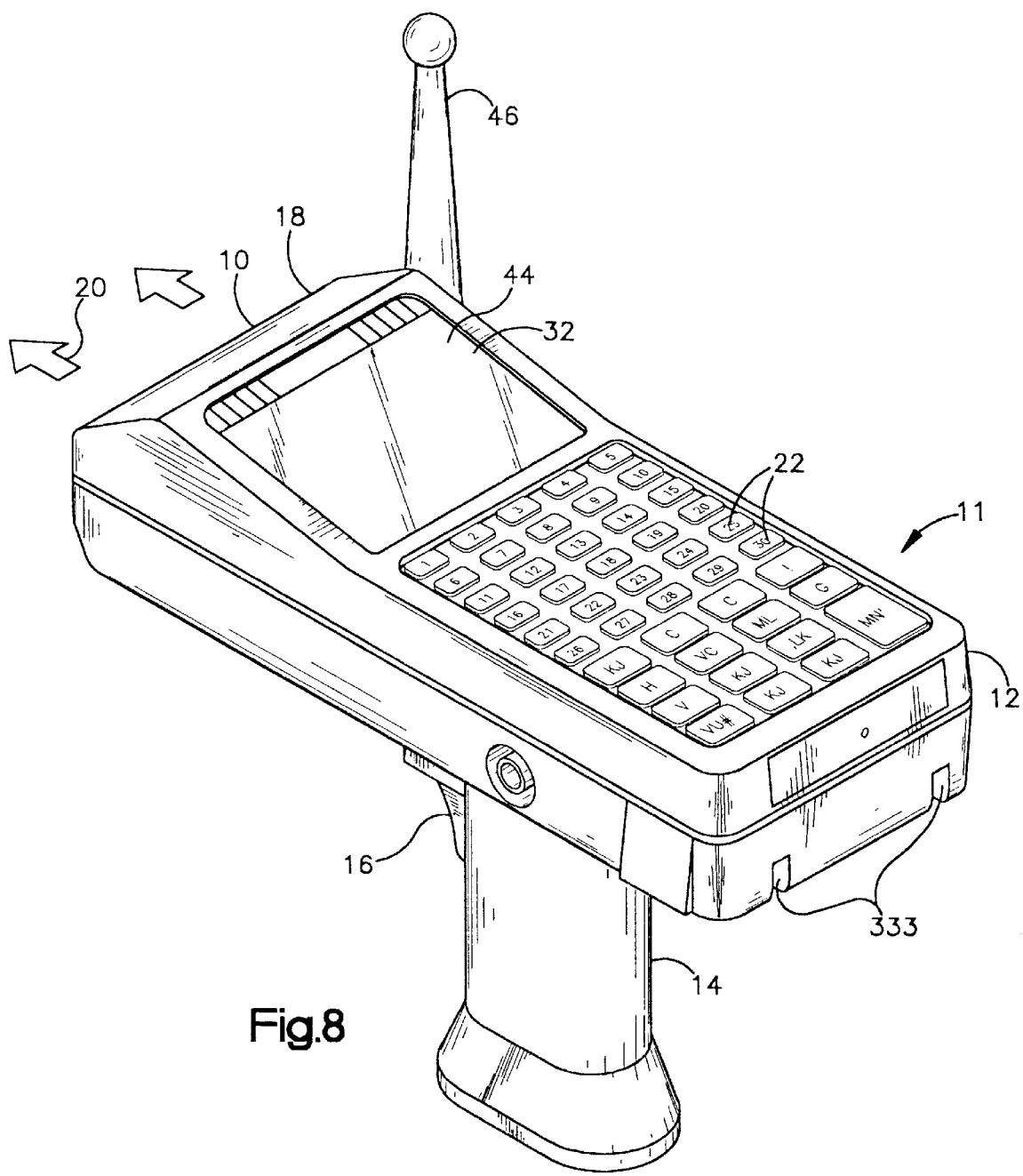
FIG. 8 shows a perspective view of a portable data collection system in 10 accordance with this invention.
Figure 9:
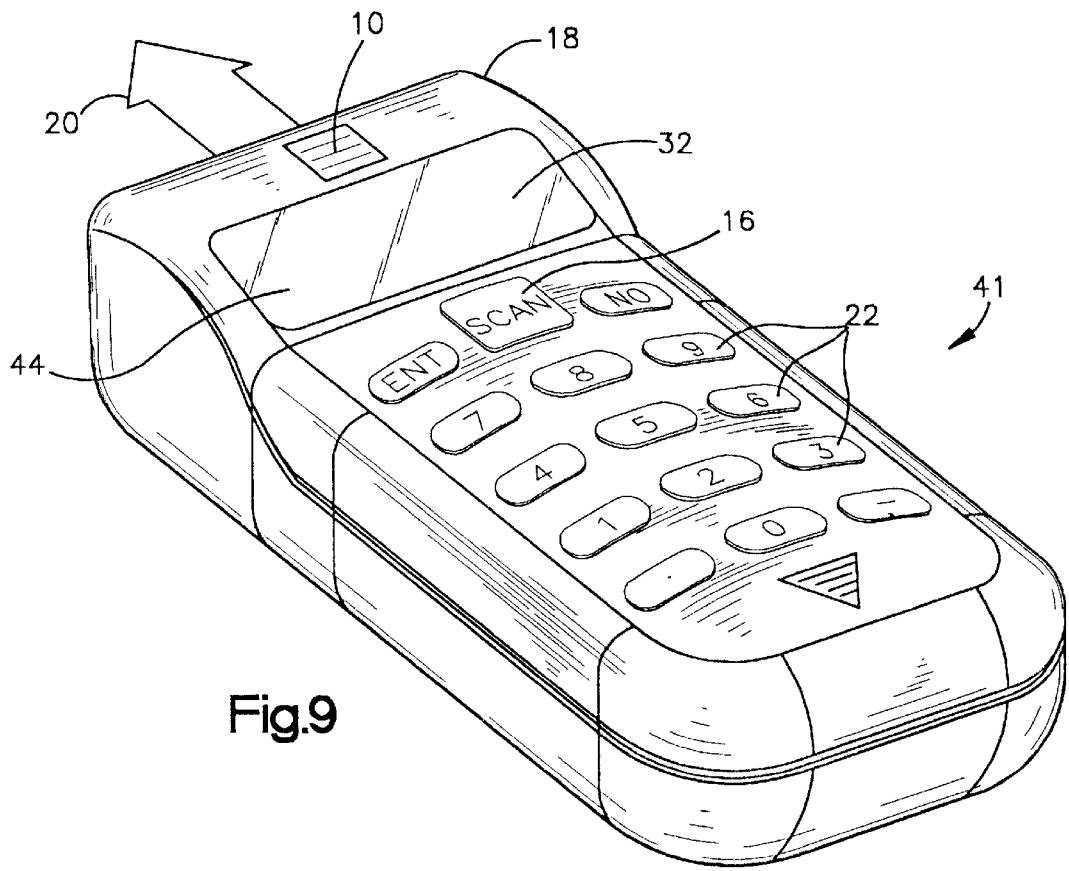
FIG. 9 shows a perspective view of an alternative portable data collection system according to this invention.

FIGS. 8 and 9 show two embodiments of a portable data collection system in accordance with this invention. Like numerals are used to identify similar parts, the housing shown in FIG. 8 is generally a gun shaped device 11 with a housing 12, forming an upper enclosure, and a handle portion 14 extending below the upper enclosure. The housing is constructed of a suitable impact resistant plastic that provides both durability and light weight. A two-position trigger switch 16 is appropriately mounted and used to provide a signal to initiate a dataform reading session. A plurality of key switches 22 and a display screen 32 with an overlaying touch panel 44 are visible on the upper surface. The system 11 shown in FIG. 9 is generally a palm sized device configured to be held in the palm of the operators hand. A plurality of key switches on the upper surface 22 are positioned to be operated by the same hand holding the device. Also on the upper surface is a display screen 32 with an overlaying touch panel 44. The housing 12 is constructed of a suitable impact resistant plastic for both durability and light weight. A multi-position trigger switch 16, to initiate a dataform reading session is located at the center of the upper surface to enable activation by the operator's thumb.

Figure 11:
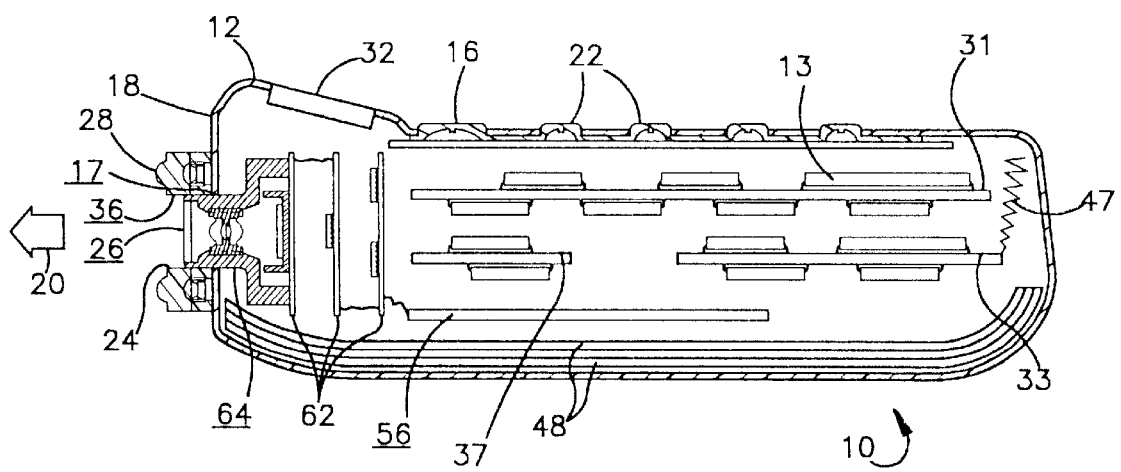
FIG. 11 shows a cut away side view of the dataform reader of FIG. 9.
Figure 10:
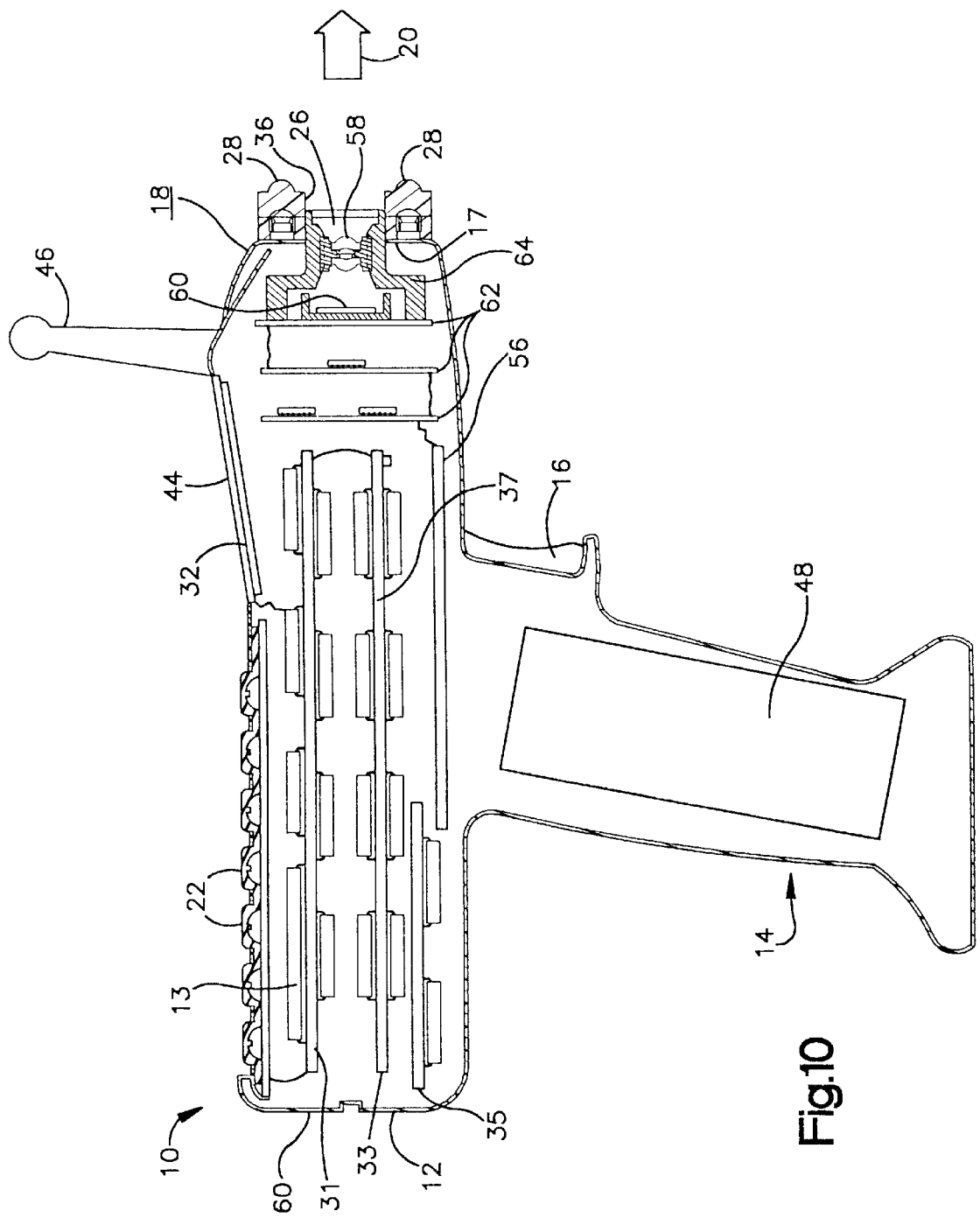
FIG. 10 shows a cut away side view of the dataform reader of FIG. 8.

Referring to FIGS. 10 and 11 which show a cut away side view of the devices of FIGS. 8 and 9 respectively, it can be seen that camera assembly 26 is positioned inside of the housing immediately behind the front surface 18. The camera housing 64 projects through the aperture 17 in the reader housing and aperture 36 in the illumination module. A seal (not shown) may be placed around the camera housing nose 64 to create a tight seal between the camera housing and the reader housing 12 to prevent dirt and moisture from entering the interior of the reader housing through the aperture 17. In the preferred embodiment, the control and decoder board 56 is coupled to a main control board 31 which includes microprocessor 13 for further processing the data transferred from the control and decoder board 56 to the main control board 31 via data transfer link 53.

The main control board 31 includes a serial output port coupled to a connector on the housing operative to transfer the decoded data or image data to a remote terminal through a cable connection (not shown). The connector may be a traditional pin connector to which a mating connector is secured. Alternatively, as shown in FIG. 1, the connector may be conductive contact surfaces 11 on the exterior of the housing 12 which align with mating contact surfaces when the device is placed in a docking station.

Because the data collection system of this invention is intended for portable use, a wired connection to a host computer is impractical in many situations. Therefore, the system includes a spread spectrum radio board 33 providing a wireless link between the main control board 31 and a remote host computer. External antenna 46 as shown in FIG. 10, or internal antenna 47 as shown in FIG. 11, operate to improve reception. The spread spectrum board 33 includes digital and analog circuitry for transmitting and receiving data in a wireless network such as an IEEE 802.11 compatible direct sequence spread spectrum or frequency hopping spread spectrum network.

Because the spread spectrum radio, the dataform reader module both draw significant current from a power cell 48, the radio should not operate during a dataform reading session and a dataform reading session should not start during communication to limit peak current draw. Therefore, the radio and the circuitry controlling the dataform reading session provide blocking signals to each other to assure that power is not being drawn simultaneously. The blocking signal from the radio to the dataform reading circuitry will prevent the initiation of a reading session. The session will be delayed until the signal desists. The blocking signal from the dataform reading circuitry to the radio will prevent the radio from sending or receiving data packets. Therefore, the network transmission protocol must be such that the radio in the portable dataform reader has complete control over when to transmit a packet and when it can receive a data packet. One such network protocol is the reverse poll protocol as described in U.S. Pat. No. 5,276,680 and assigned to Telesystems S/W Inc., the entire contents of which is hereby incorporated by reference.

In the reverse poll protocol network, the portable device radio may transmit data packets to a network access point at any time, subject to the carrier frequency being free. However, the access point can only send a packet to the portable device within a time window following receipt of a packet from the portable device. To assure that the access point has enough opportunities to transmit data to the portable, the portable will periodically send packets even though they contain no significant data.

While the spread spectrum radio is effective for transmitting the decoded contents of a dataform, the radio's limited bandwidth makes it impractical for transmitting an entire un-compressed image. An image compression algorithm useful to reduce the size of a digital image file is the two-dimensional wavelet transform as described in *A 64 kb/s Video Code Using the 2-D Wavelet Transform* by A. S. Lewis and G. Knowles, published in IEEE Computer Society Press, Order Number 2202. For example, the HARC wavelet transform system, available from Houston Advance Research Center in Houston, Tex., can be used to compress the photographic image before it is transmitted with an image compression ratio of up to 400:1.

Figure 12:
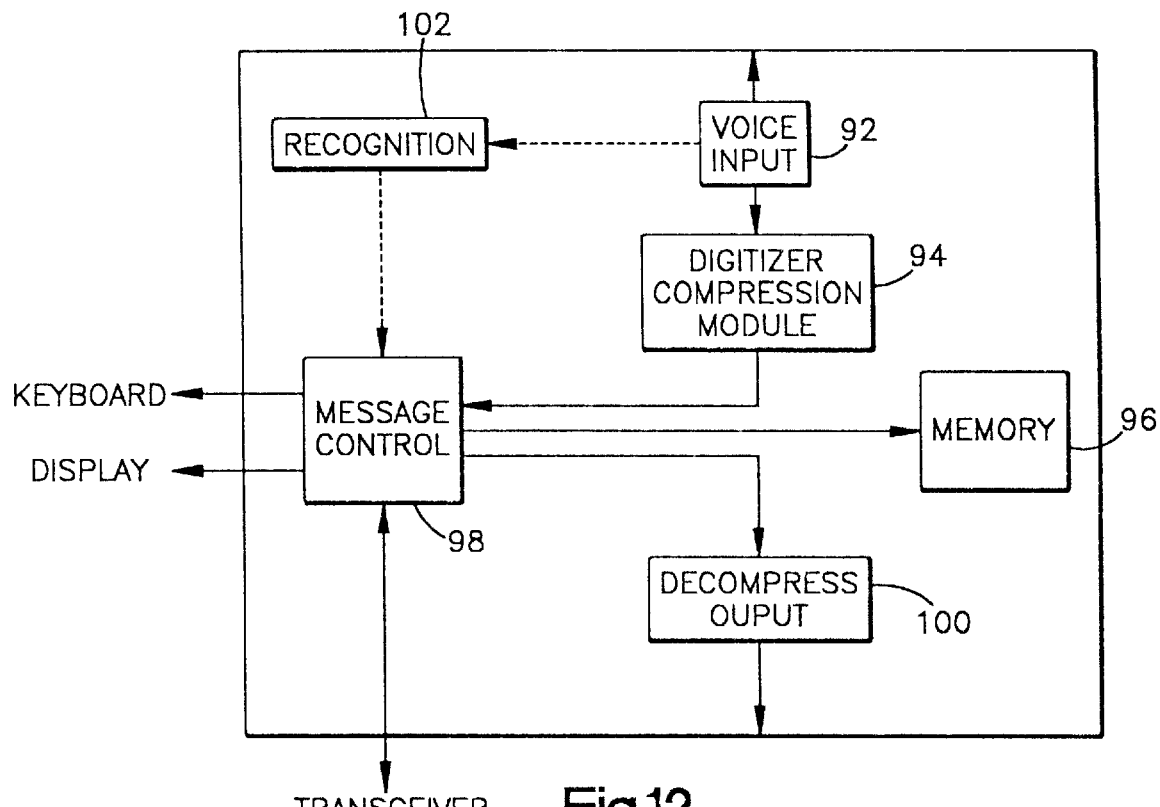
FIG. 12 shows a block diagram of the voice mail system according to the present invention.

Because the data collection system is intended for portable use, it is quite possible that an operator working at a remote location of the facility may need to request supervisory instructions while capturing dataforms. Therefore, the data collection system of this invention includes a voice mail processing board 37 so that the operator may verbally communicate with others through the spread spectrum network. Referring to FIG. 12, a block diagram of the voice mail circuitry is shown which may be embodied in a microprocessor system or voice mail processing board 33 and terminal control board 31. A voice message is input through an audio input circuit 92 which can include an internal microphone or a port for connection to an external microphone which will be discussed in more detail later. A digitizer/compression module 94 will create a digital data file representative of the audio input.

Prior to transmitting the message, the message control unit 98 will prompt the operator to identify the addressee. The prompt may take the form of an audible signal to the operator through the audio output circuit 100 (discussed later), or a display screen message.

In a time window following the prompt, the operator must identify the addressee. This can be done through the keyboard 22 or touch panel 44 (shown in FIGS. 8–9). Alternatively, the addressee may be identified by audio input. In this embodiment, voice recognition circuitry 102 will operate to convert the audio signal to a digital address.

The message control unit 98 will add the address to the message and relay the message to the spread spectrum transceiver for broadcast to the addressee. It should be appreciated that the voice mail system could require operator identification of the addressee before or after input of the message.

The message control unit 98 operates to receive data files representative of incoming voice mail messages and stores such messages in memory 96. Upon receipt of an incoming message, the control unit 98 notifies the operator of receipt through the audio output circuit 100, the display screen or a dedicated illuminator.

Upon an operator prompt to output the voice mail message, the control unit 98 will retrieve the data file from memory. A decompression module will convert the data file to an analog signal and audio output circuitry, which may include a speaker or a port for a remote speaker or headset will output the message. The operator prompt to output the message may be through the keyboard 22, touch panel 44 or the voice input circuit 92.

After output of the message, the voice mail unit of this invention can optionally store the message for later playback or erase the message. In conjunction with storage or erasure, the message may be forwarded or responded to. The control unit will prompt the operator to input the various permutations of these options. If the message is stored, the digital data file will remain in memory 96. If forwarded, the data file, or a copy, will be appropriately addressed and transmitted to the spread radio 33.

If the respond option is selected, the identity of the address of the response message is known and the control unity 98 prompts the operator to input a response message. The digital data file representative thereof is sent by the spread radio.

Figure 13:
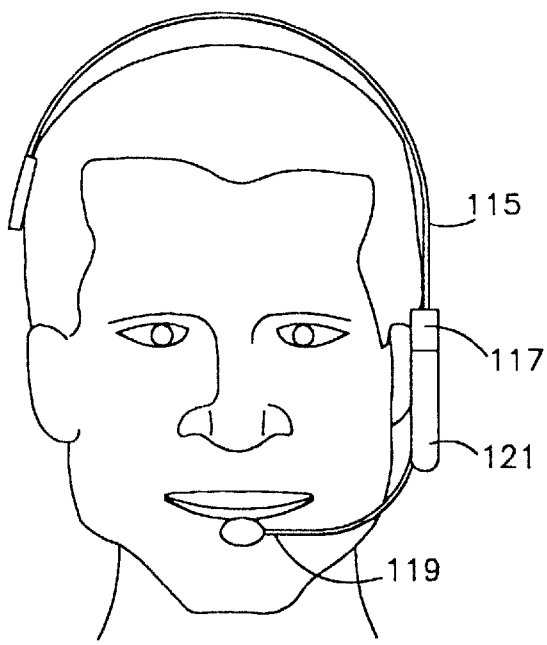
FIG. 13 shows a wireless headset in accordance with this invention.

Referring to FIG. 9, the speaker 50 and the microphone 52 are preferably positioned so that the reader may be held along the side of the operators face like a telephone set for communication. Referring to FIG. 13, the speaker and microphone are embodied in a wireless headset. The headset includes a headband 115 for holding the device on an operators head, a speaker 117 positioned near the operators ear and a microphone 119 positioned near the operators mouth. A micro-radio module and power source are located in a housing 121 attached to the headset.

Referring again to FIG. 10, the housing includes a similar microradio embodied on board 35 for transcieving audio signals with the headset. The micro-radio operates on a narrow band modulation scheme wherein the band is aligned in a null of the frequency spectrum of the spread spectrum radio.

In addition to operating in conjunction with a wireless headset, the micro-radio can function as a wireless peripheral port so that the operator may print a dataform label without physically connecting the data collection system to a printer. Printers or other peripheral devices with similar micro-radio boards may be placed throughout the installation in which the data collection system is operated. When an operator approaches the peripheral device with the system, a hand shake sequence is initiated and a wireless link is established. Data may then be printed out on the peripheral device.

Because the data collection system of this invention is intended for portable use it is desirable that the power source 48 provide for operation over an extended period of time without requiring recharging.

Although the power source 48 could be any rechargeable cell, the preferable power source is a plurality of Lithium Polymer flexible battery cells. Each flexible sheet is about 0.002" (2 mils) thick and appears to be a sheet of plastic. To construct such a cell, $Li Mn_2 O_4$ is used as the cathode and carbon as the anode. Such a cell is available from Bellcore of Red Bank, N.J. One advantage of the lithium polymer cells is that the flexible sheet form factor is such that the cells may be folded and placed in areas of the housing which are of inadequate space for traditional cylindrical cells. In FIG. 9, the polymer sheet cells 48 are advantageously shown along the surface of the housing interior wherein the polymer cells also function to reduce unwanted EMS. In addition to the form factor and EMS advantages, the lithium polymer cells are rechargeable and provide about 3 times the energy density as the NiCad cells and do not suffer the NiCad crystallization that produces the degenerative memory effect.

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A two dimensional imaging based dataform reader module for use in a dataform reader, the reader module comprising:

a) an illumination module directing illumination towards a target area and including targeting illuminators and exposure illuminators;

b) a camera module including a photosensor array generating a signal representative of an image of the target area;

c) control circuitry to selectively energize the illumination module and the camera module during a dataform reading session and to turn off the illumination module and camera module upon completion of the dataform reading session, the dataform reading session including a targeting state and a dataform read state, the dataform read state including an exposure substate and a decode substate;

d) the control circuitry, during the targeting state, energizing the targeting illuminators and turning off the exposure illuminators and the camera module;

e) the control circuitry, during the exposure substate of the dataform read state, energizing the exposure illuminators and the camera module and turning off the targeting illuminators; and f) the control circuitry, during the decode substate of the dataform read state, energizing the targeting illuminators and turning off the exposure illuminators and the camera module.

* * * * *